United States Patent

Perrignon de Troyes et al.

[11] Patent Number: 5,957,414
[45] Date of Patent: *Sep. 28, 1999

[54] SUPPORT SYSTEM, IN PARTICULAR FOR AN ELECTRICAL DEVICE, ADAPTED TO BE ATTACHED TO A TRUNKING BODY

[75] Inventors: François Perrignon de Troyes, Mont Saint Jean; Bertrand Decore, La Chapelle Saint Aubin, both of France

[73] Assignees: Legrand; Legrand SNC, both of Limoges, France

[*] Notice: This patent issued on a continued prosecution application filed under 37 CFR 1.53(d), and is subject to the twenty year patent term provisions of 35 U.S.C. 154(a)(2).

[21] Appl. No.: 08/755,563

[22] Filed: Nov. 25, 1996

[30] Foreign Application Priority Data

Nov. 23, 1995 [FR] France .................. 95 13936

[51] Int. Cl.⁶ ........................................ H02G 3/04
[52] U.S. Cl. .................. 248/27.1; 248/544; 248/558; 248/906; 248/909; 174/49; 174/101; 52/220.7
[58] Field of Search ................. 248/27.1, 27.3, 248/906, 544, 558, 909; 174/48, 49, 95, 96, 97, 98, 99 R, 101; 52/220.7, 100

[56] References Cited

U.S. PATENT DOCUMENTS

| | | | |
|---|---|---|---|
| 2,316,389 | 4/1943 | Atkinson | 248/906 X |
| 3,780,353 | 12/1973 | Gordon et al. | 248/27.1 X |
| 3,911,637 | 10/1975 | Schmidiger | 287/52 |
| 4,062,470 | 12/1977 | Boteler | 248/27.1 X |
| 4,462,564 | 7/1984 | Alves et al. | 248/27.1 |
| 4,742,978 | 5/1988 | Ponticelli | 248/27.1 |
| 4,911,386 | 3/1990 | Putman et al. | 248/27.1 X |
| 5,086,194 | 2/1992 | Bruinsma | 174/48 |
| 5,314,159 | 5/1994 | Szarata | 248/476 |
| 5,547,307 | 8/1996 | Decore et al. | |

FOREIGN PATENT DOCUMENTS

| 7605009 | 11/1977 | Netherlands | H02G 3/28 |
|---|---|---|---|
| 9112461 | 8/1991 | WIPO | F16M 13/00 |

OTHER PUBLICATIONS

"De Afwerking Van Het Deksel", p. 3, Kleinhuis, 1993, Annexe 2.
"Box and suppport for fixtures", p. 4, unidentified source and undated.

*Primary Examiner*—Ramon O. Ramirez
*Assistant Examiner*—Stephen S. Wentsler
*Attorney, Agent, or Firm*—Young & Thompson

[57] ABSTRACT

A support system for devices, in particular electrical devices, to be attached transversely to a trunking body between two longitudinal walls of the latter comprises two crossmembers each engaged with one of the longitudinal walls at each end and each equipped with fixing arrangements for local fastening of the device. These fixing arrangements are mounted on the crossmember so that their position can be adjusted along its length.

15 Claims, 4 Drawing Sheets

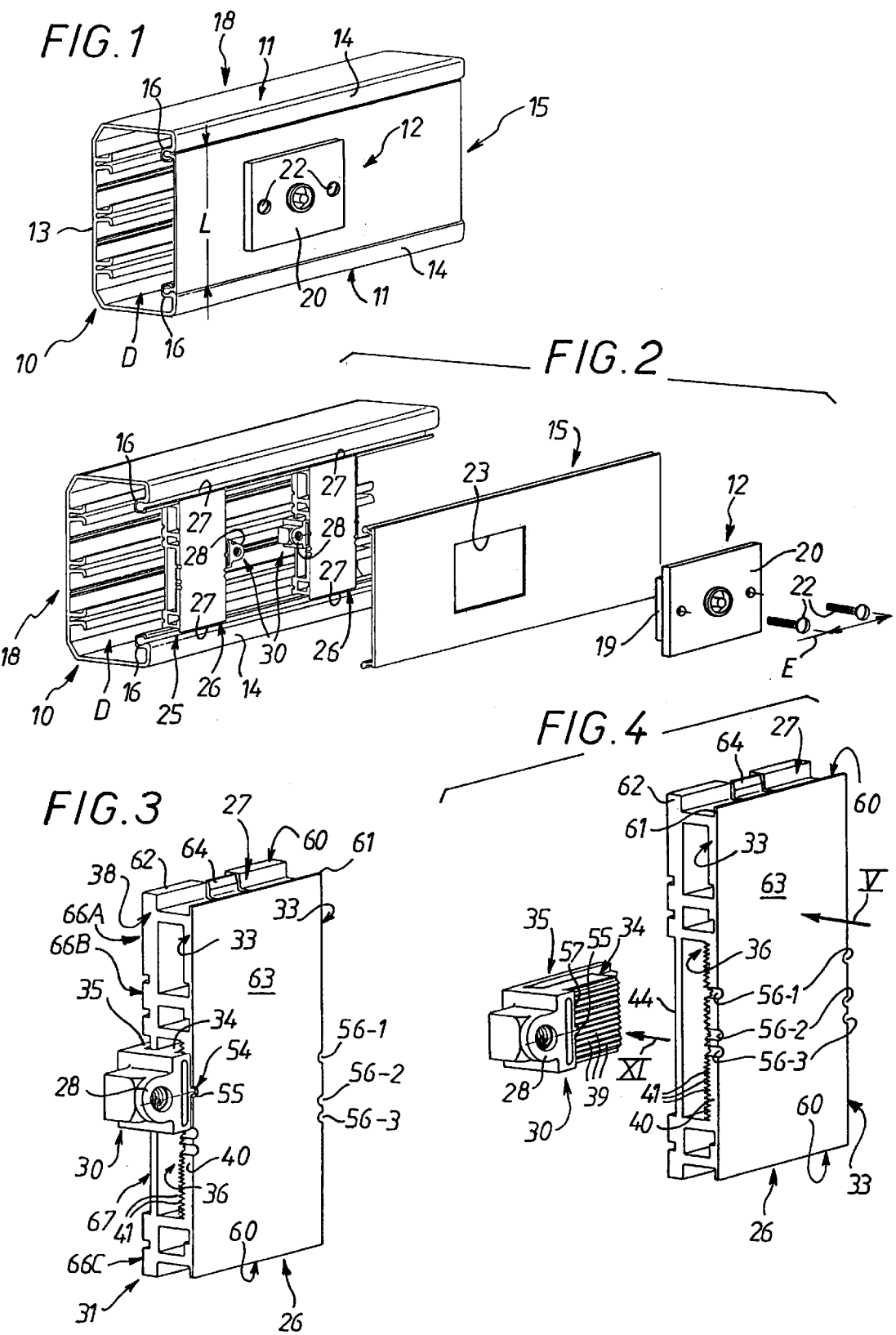

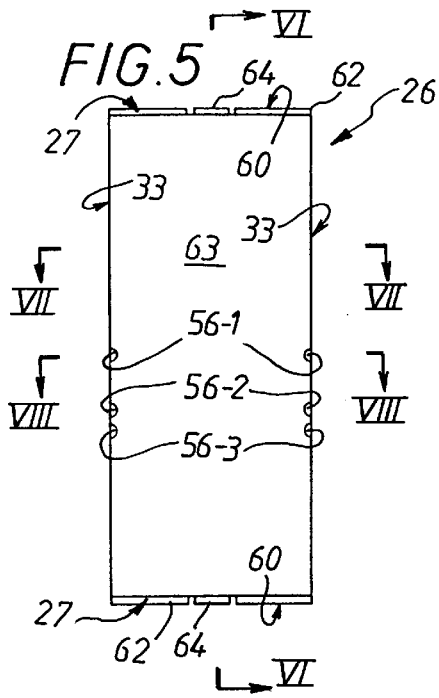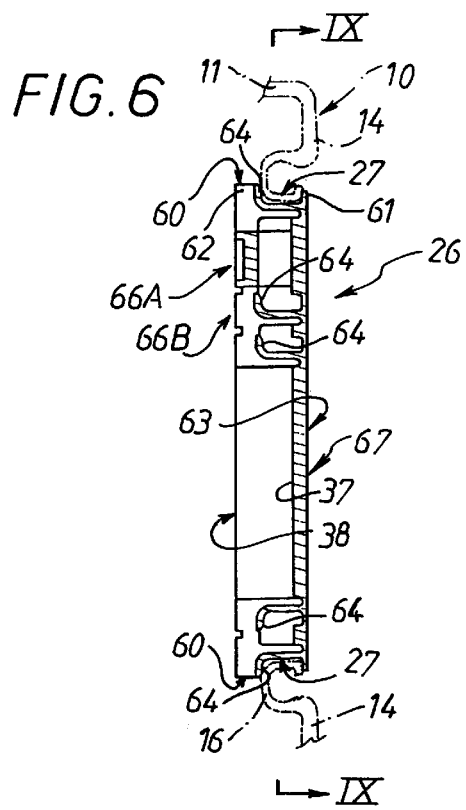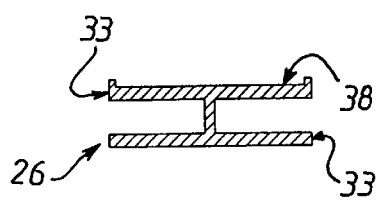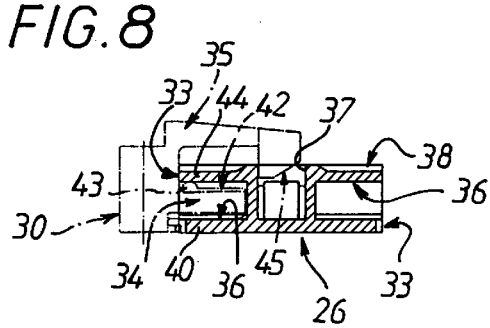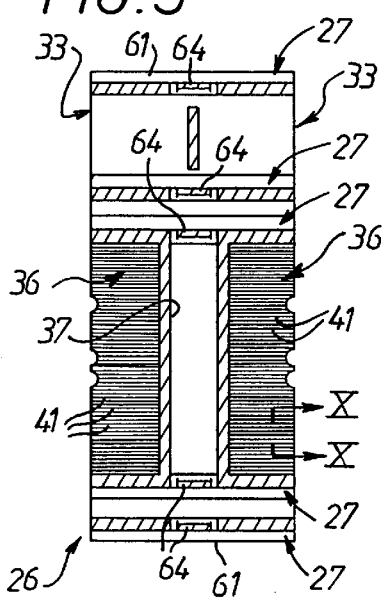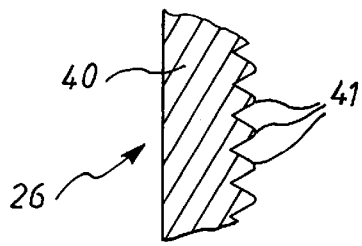

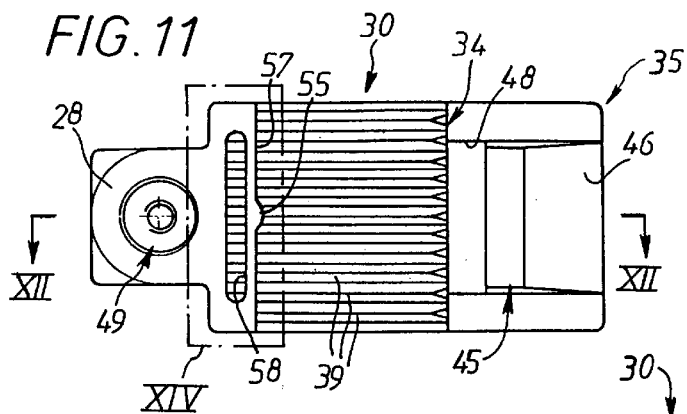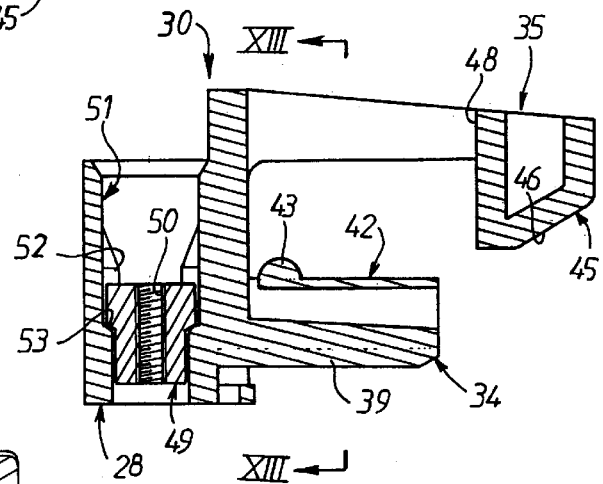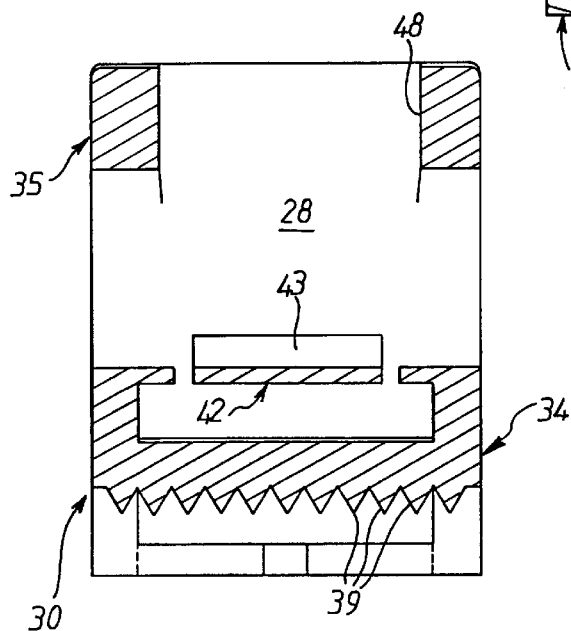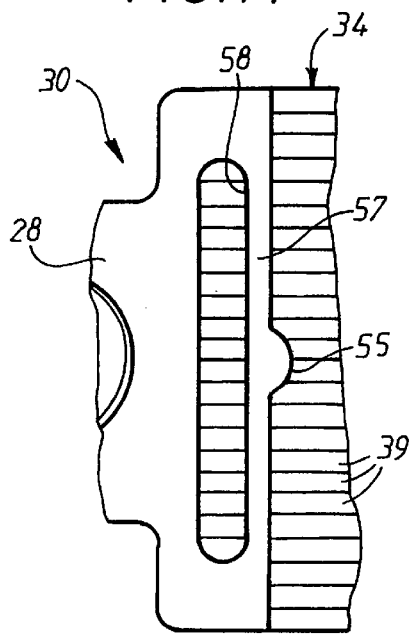

SUPPORT SYSTEM, IN PARTICULAR FOR AN ELECTRICAL DEVICE, ADAPTED TO BE ATTACHED TO A TRUNKING BODY

BACKGROUND OF THE INVENTION

1. Field of the Invention

The present invention concerns a support system used to attach a device transversely to a trunking body, between two longitudinal walls of the latter, whether these are a lateral flange of the trunking body or an internal partition that it may incorporate in order to subdivide its interior volume into two or more compartments, and is more particularly, although not necessarily exclusively, directed to the situation in which the device is an electrical device such as a socket outlet, for example.

2. Description of the Prior Art

More particularly still, the present invention concerns support systems of this kind that include two crossmembers each having engagement means adapted to be engaged with a longitudinal wall of the trunking body, for example with a lip that the longitudinal walls usually have facing towards each other along their free edge for clipping on a cover, and each of which crossmembers is provided with fixing means for locally fastening the device to be fixed, this fastening being effected by means of a screw, for example.

It is advantageously possible to adapt the support system to any distance between fixing centers parallel to the length of the trunking body, and therefore parallel to the length of the cover, by moving the crossmembers apart.

In some existing embodiments it is further possible, at least to some degree, to adapt the length of the crossmembers to suit the distance in the widthwise direction between the two longitudinal walls concerned of the trunking body and therefore to suit the width of the cover.

In these existing embodiments, however, each of the crossmembers comprises for this purpose at least three parts, namely a central part that includes the fixing means and which has one or more break-off portions at each end, and end parts that incorporate the engagement means required for engagement of the system with the longitudinal walls concerned of the trunking body to be equipped, and which are adapted to fit over the ends of the central part in a nesting arrangement, like a ferrule.

To adapt the width as required, it is therefore sufficient to remove one or more of the break-off portions of the central part.

This system nevertheless has various drawbacks, essentially relating to the inevitable interdependence of the adaptation to suit the width of the cover and the final position of the fixing means.

If, for example, and as is usually the case, the device to be fixed on must be centered, i.e. if the fixing means must be on the mid-line of the cover, it is necessary, for obvious reasons of symmetry, to remove the same number of break-off portions from each end of the central part of the crossmembers, and consequently to operate on both ends of the latter.

Moreover, the adjustment of the position of the fixing means in the widthwise direction of the cover has always to be carried out step by step, because of the length of the break-off portions of the central part of the crossmembers.

A general object of the present invention is an arrangement avoiding these drawbacks and conferring other advantages.

SUMMARY OF THE INVENTION

To be more precise, the present invention consists in a support system for devices, in particular electrical devices, to be attached transversely to a trunking body between two longitudinal walls of the latter, comprising two crossmembers with engagement means each adapted to be engaged with one of said longitudinal walls at each end and each of which is equipped with fixing means for local fastening of said device, wherein said fixing means with which a crossmember is equipped are mounted thereon so that their position can be adjusted along its length.

In one preferred embodiment, the fixing means are part of a member which, separate from the crossmember to which it is fitted, is mobile along the latter, for example.

Be this as it may, because of the arrangement in accordance with the invention there is advantageously some degree of independence between the adaptation of the length of the crossmembers to suit the width of the cover and the adjustment, if any, of the position of the fixing means with which the crossmember is equipped.

As a result, for the adaptation to suit the width of the cover it is possible, in some cases at least, to operate on one end only of the crossmembers, the adjustment of the position of the fixing means then compensating for their off-center position.

Another result is that, for a given length of the crossmembers, it is possible to modify the position of the fixing means to enable some degree of off-center location of the device to be fixed, for example, as may be necessary if the device is attached to an embellisher plate relative to which it is itself off-center, and as may also be necessary if, the trunking body comprising two longitudinal compartments disposed side-by-side, the installation of two devices side by side in respective compartments would otherwise be ruled out by the risk of the two devices overlapping.

Finally, in all cases the arrangement of the invention has the advantage of enabling continuous or substantially continuous adjustment of the position of the fixing means with which the crossmembers are equipped, over at least a portion of the length of the crossmembers.

The features and advantages of the invention will emerge further from the following description given by way of example with reference to the accompanying diagrammatic drawings.

BRIEF DESCRIPTION OF THE DRAWINGS

FIG. 1 is a perspective view of trunking to the body of which a device is attached by means of a support system of the invention.

FIG. 2 is an exploded perspective view of the support system.

FIG. 3 is a perspective view to a larger scale of one of the crossmembers of the support system of the invention and the member carrying the fixing means with which it is equipped.

FIG. 4 is an exploded perspective view of the crossmember and this member.

FIG. 5 is a front elevation view of the crossmember as seen in the direction of the arrow V in FIG. 4.

FIG. 6 is a view of it in longitudinal section on the line VI—VI in FIG. 5.

FIGS. 7 and 8 are views of it in cross-section on the respective lines VII—VII and VIII—VIII in FIG. 5.

FIG. 9 is a view of it in section on the line IX—IX in FIG. 6.

FIG. 10 is a partial view of it to a larger scale and in longitudinal section on the line X—X in FIG. 9.

FIG. 11 is a front elevation view of the member carrying the fixing means to a scale larger than that of FIG. 4 and as seen in the direction of the arrow XI in the latter figure.

FIG. 12 is a view of this member in longitudinal section on the line XII—XII in FIG. 11.

FIG. 13 is a view of it to a still larger scale and in cross-section on the line XIII—XIII in FIG. 12.

FIG. 14 shows to a still larger scale the detail XIV from FIG. 11.

DETAILED DESCRIPTION OF THE PREFERRED EMBODIMENT

Figure 15:
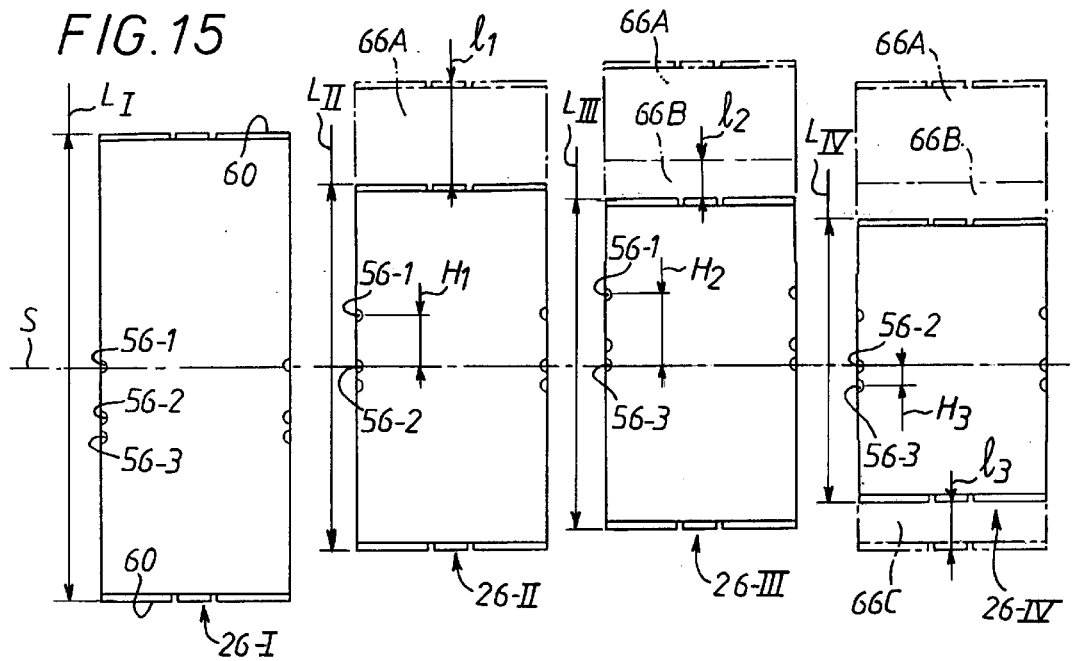
FIG. 15 is a diagrammatic front elevation view showing the possibilities of adaptation of the crossmembers of the support system of the invention to suit different widths of cover.

As shown in the figures, and as seen particularly clearly in FIGS. 1 and 2, the aim is to attach a device 12 transversely to a trunking body 10, between two longitudinal walls 11 of the latter.

In the embodiment shown more particularly in FIGS. 1 and 2 the trunking body 10 has a generally U-shaped profile in cross-section and, in itself, defines only one longitudinal compartment D.

The longitudinal walls 11 between which the device 12 must be installed are thus the exterior lateral flanges of the trunking body 10 in this case.

They are substantially perpendicular to the backing plate 13 of the latter, and they are both the same height.

In the embodiment shown the longitudinal walls 11 each have a lip 14 along their free edge, substantially parallel to the back plate 13 and facing inwards, with a bead 16 at the free end forming a groove for clipping on a cover 15.

The trunking 18 formed in this way by a trunking body 10 and the cover 15 is well known in itself and for this reason will not be described in more detail here.

In practice it is electrical trunking when, the device 12 being an electrical device, it is adapted to house and to protect electrical conductors (not shown) connected to the device.

In the remainder of the description, L is the transverse width-wise distance between the longitudinal walls 11, as measured between the grooves formed by the bead 16 on their lip 14.

This distance L is substantially equal to the width of the cover 15.

In the embodiment shown, the lip 14 is the same width on each of the longitudinal walls 11.

The device 12 does not in itself constitute any part of the present invention and will therefore not be described in detail here.

Suffice to say that it incorporates a mechanism 19 and, at the front, an embellisher plate 20 to which the mechanism 19 may or may not be fastened and the perimeter of which is larger than that of the mechanism.

The device 12 is a television antenna outlet, for example, as shown here.

Be this as it may, in the embodiment shown, fixing it to the trunking body 10 entails the use of two fixing means 22 with a distance E between centers parallel to the lengthwise direction of the trunking body 10 and therefore lengthwise of the cover 15.

For reasons of symmetry, the fixing is usually effected on the mid-line of the cover 15, in its median plane.

In the embodiment shown, and given the equal width of the lips 14 on the longitudinal walls 11, this median plane is coincident with the longitudinal plane of symmetry S of the compartment D of the trunking body 10, and the fixing means 22 are therefore operative in this longitudinal plane of symmetry S.

The location of this plane is symbolized in FIG. 15.

In the embodiment shown, the fixing means 22 are screws.

The cover 15 may be locally interrupted to install the device 12.

As shown here, however, a localized opening 23 may instead be made in the cover for the mechanism 19 alone to pass through, the opening 23 having a perimeter between that of the mechanism 19 and that of the embellisher plate 20.

A support system 25 adapted to receive the device 12 is used to fix the device 12 to the trunking body 10.

In a manner that is known in itself, the support system 25 includes two crossmembers 26 each adapted to be engaged with one of the longitudinal walls 11 of the trunking body 10 at each end, through engagement means 27 described in more detail below, and each of which is equipped with fixing means 28 for locally fastening the device 12 to be fixed and for this reason adapted to cooperate with the fixing means 22.

In the embodiment shown, the fixing means 28 are in the form of a single fixing well and, the fixing means 22 being screws, this is in practise a screw well.

In accordance with the invention, the position of the fixing means 28 with which a crossmember 26 is equipped in this way can be adjusted along its length.

To be more precise, and as described in more detail below, the position of the fixing means 28 can be adjusted in a substantially continuous manner along at least a portion of the length of the crossmember 26.

In the embodiment shown, the fixing means 28 with which a crossmember 26 is equipped are in practise part of the member 30 separate from the crossmember 26, mobile on the latter and adapted to be locked in position on it.

Carried by the crossmember 26, the member 30 of which the fixing means 28 associated with the crossmember 26 are part is appropriately secured to the crossmember 26, forming with it a unitary subassembly 31 (FIG. 3).

In the embodiment shown the fixing means 28 with which a crossmember 26 is equipped extend laterally from one edge 33 of the crossmember 26, i.e. they project cantilever fashion transversely to the edge 33, which in this example is a longitudinal edge, and the member 30 of which they are part has at least one laterally projecting lug 34, 35 engaged with the crossmember 26.

In this embodiment, and as seen more clearly in FIG. 12, the member 30 in practise includes two substantially parallel lugs 34, 35, namely a locking lug 34 at the front by means of which it is engaged in a slot 36 provided for this purpose in the thickness of the crossmember 26, along at least a part of the length of the edge 33 of the latter concerned, and a retaining lug 35 at the rear by means of which, circumventing the crossmember 26, it is hooked into a groove 37 formed for this purpose on the rear face 38 of the crossmember 26, parallel to the edge 33.

Both the lugs 34, 35 are substantially perpendicular to the axis of the well that the fixing means 28 constitute.

The locking lug 34, which is shorter than the retaining lug 35, has parallel detents 39 projecting from its top surface in the lengthwise direction and therefore transversely to the crossmember 26, and the corresponding flank 40 of the slot 36 in the crossmember 26 incorporates parallel transverse detents 41 complementary to the detents 39.

Parallel to and spaced from its locking lug 34, the member 30 of which the fixing means 28 are part has an elastically deformable tongue 42 with a rounded bead 43 at its free end bearing on the other flank 44 of the slot 36 in the crossmember 26 (FIGS. 8, 12 and 13).

Accordingly, the locking lug 34 of the member 30 is at all times urged elastically towards the flank 40 of the slot 36 in the crossmember 26, so that its detents 39 are normally engaged at all times with the detents 41 of the latter.

The retaining lug 35 of the member 30 has a boss 45 at its free end, beyond the free end of the locking lug 34, forming a detent by which it is engaged with the groove 37 in the crossmember 26.

To facilitate its insertion into the groove 37, the boss 45 has a chamfer 46 along its leading edge (FIGS. 11 and 12).

To facilitate molding of the system, the retaining lug 35 has an opening 48 in it between the fixing means 28 and the boss 45.

In the embodiment shown, the well at the fixing means 28 constitute is equipped in advance with a bush 49 having a screwthreaded bore 50.

As shown here, for example, the bush 49 is simply force-fitted from behind into the well, the interior space 51 of the latter including longitudinal projections 52 for axially retaining the bush 49 in a direction opposing its expulsion upon screwing in the screw and a transverse shoulder 53 for retaining it axially in the opposite direction (FIG. 12).

As shown here, indexing means 54 are preferably provided between the member 30 and the crossmember 26 (FIG. 3).

In the embodiment shown, the indexing means 54 include a rounded boss 55 on the member 30 and at least one rounded notch 56 complementary to the boss 55 on the crossmember 26.

The boss 55 is in practise carried by an elastically deformable blade member 57 at the front extending substantially transversely to the lugs 34, 35 above the locking lugs 34 and which is integral at each end with the fixing means 28, being otherwise separated from the latter by a slot 58.

The boss 55, which is substantially halfway along the elastically deformable tongue 57, is in line with the axis of the well that the fixing means 28 constitute.

The notch 56 is in the edge 33 of the cross member 26, to be more precise the part of the edge 33 that is part of the flank 40 of the slot 36.

In the embodiment shown, a plurality of notches 56 are in practise provided.

As shown here, for example, there are three notches 56, respectively labeled 56-1, 56-2 and 56-3 in FIGS. 3 and 4, and the arrangement of which is described in detail below.

As will emerge below, the indexing means 54 define a plurality of discrete positions of the member 30 of which the fixing means 28 are part.

In the embodiment shown, the crossmember 26 is in one piece.

In this embodiment, it is in the form of a plate with a four-sided (in practise rectangular) contour.

It therefore has, in this embodiment, two edges 33 which are in practise its longitudinal edges and along which extends the member 30 including the associated fixing means 28 and two edges 60 substantially perpendicular to the aforementioned edges, and which are therefore its transverse edges, and along each of which the engagement means 27 are operative.

To be usable either on the righthand side or on the lefthand side of the device 12, the crossmeriber 26 preferably has a plane of symmetry parallel to its longitudinal edges 33.

It therefore has on each of its two opposite sides 33 a slot 36 and notches 56 and the groove 37 extends along a median line in its longitudinal plane of symmetry.

Accordingly, although forming separate parts, i.e. parts with no connection between them other than that assured by the device 12, the two crossmembers 26 constituting the support system 25 of the invention are advantageously identical.

In the embodiment shown, the engagement means 27 that a crossmember 26 has at each end to engage a longitudinal wall 11 of the trunking body 10 are groove means in the corresponding edge 60.

In other words, the crossmember 26 forms two lips 61, 62 on each of its transverse edges 60 and along all of the length of the latter, one on the same side as the front face 63 and the other on the same side as the rear face 38, defining corresponding groove means, in this example a groove.

To facilitate the engagement of the cover 15 with the crossmembers 26, the lip 61 on the same side as the front face 63, at the same level as the front face 63 and continuous with it, is intentionally of reduced thickness.

It thickness is in practise less than that of the lip 62 on the same side as the rear face 38.

In the embodiment shown, the lip 62 is locally interrupted in its middle portion by an elastically deformable lug 64 which exerts a localized grip on the corresponding bead 16 on the lip 14 of the longitudinal wall 11 of the trunking body 10, lightly squeezing the corresponding groove, to immobilize the support system on the latter.

The elastically deformable lug 64 holds the crossmembers 26 in place on the trunking body 10, compensating inevitable manufacturing tolerances.

At one end at least, i.e. along one transverse edge 60 at least, each of the crossmembers 26 has at least one break-off portion 66 parallel to the edge 60, and the engagement means 27 that it incorporates for its engagement with a longitudinal wall 11 of the trunking body 10 are repeated thereon, its permanent central portion 67 and its break-off portion 66, or each of its break-off portions 66, incorporating these engagement means 27.

In the embodiment shown, the crossmember 26 in practise comprises a plurality of break-off portions 66.

To be more precise, in this embodiment there are two break-off portions 66A, 66B at one end of the crossmember 26 and one break-off portion 66C at the other end.

The break-off portions 66A, 66B are of different sizes, the break-off portion 66A, which is the first starting from the edge 60, having a width $l_1$ parallel to the edges 33 greater than that $l_2$ of the next break-off portion 66B (FIG. 15).

The break-off portions 66B, 66C are substantially the same size.

In other words, the width $l_3$ of the break-off portion 66C is substantially equal to that $l_2$ of the break-off portion 66B.

However, all the break-off portions 66A, 66B, 66C have individual engagement means 27, i.e. groove means, with an elastically deformable lug 64 in their middle portion, and likewise the permanent central portion 67.

Of course, the slot 36 in a crossmember 26 for the member 30 extends over only its permanent central portion 67.

When, as shown at 26-I in FIG. 15 for one of them, the crossmembers 26 are used with their full length i.e. with all of their break-off portions 66 present, they are appropriate to a first value $L_I$ for the width of the cover 15.

If, as is usually the case, the device 12 must be centered, being disposed substantially in the longitudinal plane of symmetry S of the compartment D of the trunking body 10, the boss 55 of the member 30 associated with each of the crossmembers 26 engages with the notch 56-1 of the latter and, in practise, this notch 56-1 is halfway between the transverse edges 60 of the crossmembers 26.

When, as shown in dashed outline at 26-II the break-off portion 66A of the crossmembers 26 is removed, the crossmembers 26 are appropriate to a value $L_{II}$ less than the previous value $L_I$ for the width of the cover 15.

If, as before, the device 12 must be centered, the member 30 is engaged with the notch 56-2.

When, as shown in dashed outline at 26-III in FIG. 15, the two break-off portions 66A, 66B of the crossmembers 26 are removed, the crossmembers 26 are appropriate to a value $L_{III}$ less than the previous values $L_I$, $L_{II}$ for the width of the cover 15.

If, as previously, the device 12 must be centered, the member 30 is engaged with the notch 56-3.

Finally, when, as shown in dashed outline at 26-IV in FIG. 15, the three break-off portions 66A, 66B, 66C of the crossmembers 26 are all removed, the crossmembers 26 are appropriate to a value $L_{IV}$ less than the previous value $L_I$, $L_{II}$, $L_{III}$ for the width of the cover 15.

If, as previously, the device 12 must be centered, the member 30 is engaged with the notch 56-2.

It follows from the foregoing description that the distance $H_1$ between the two notches 56-1, 56-2 is substantially equal to half the width $l_1$ if the break-off portion 66A, likewise that the distance $H_2$ between the notches 56-1, 56-3 is substantially equal to half the sum of the width $l_1$ of the break-off portion 66A and the width $l_2$ of the break-off portion 66B, and that the distance $H_3$ between the two notches 56-2, 56-3 is substantially equal to half the width $l_3$ of the break-off portion 66C.

Figure 16:
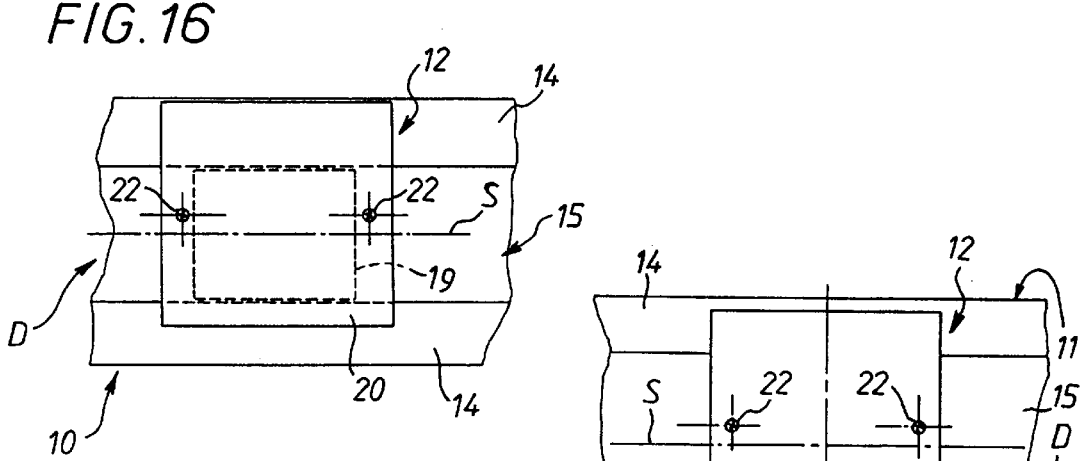
FIGS. 16 and 17 are also diagrammatic front elevation views showing the possibilities of the support system of the invention in particular installation conditions.

FIG. 16 shows the situation in which the mechanism 19 of the device 12 is off-center relative to its embellisher plate 20.

In a situation like this, if, as previously, the mechanism 19 must be centered relative to the compartment D of the trunking body 10, lying in its longitudinal plane of symmetry S, the embellisher plate 20 cannot be centered.

In this case, it is sufficient to move the members 30 carrying the fixing means 28 along the crossmembers 26, as necessary, as illustrated by the fixing means 22 in FIG. 16.

Figure 17:
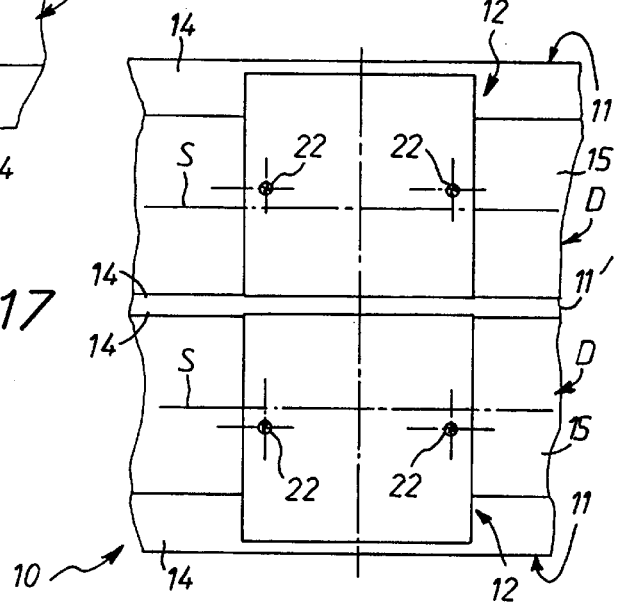

FIG. 17 shows the situation in which the trunking body 10 defines two longitudinal compartments D between its longitudinal walls 11, separated from each other by a longitudinal wall 11' between the longitudinal walls 11 and forming an internal partition between the latter.

When two devices 12 are in line with each other in respective compartments D, it may be necessary for one or both to be off-center, as shown for both of them in FIG. 17.

In this case, it is sufficient, as previously, to move the members 30 carrying the fixing means 28 accordingly relative to the corresponding longitudinal plane of symmetry S or, more precisely, relative to the median plane of the corresponding covers 15 when, as here, the lips 14 on the longitudinal walls 11, 11' concerned of the trunking body 10 have different widths, as illustrated by the corresponding fixing means 22 in FIG. 17.

The adjustment of the position of the fixing means 28 lengthwise of the crossmembers 26, if not strictly continuous, is at least substantially continuous, in practise by increments of one detent.

When, as here, the fixing means 22 are screws, the fixing means 22 always lock in position on the crossmember 26 the members 30 carrying the associated complementary fixing means 28.

Of course, the present invention is not limited to the embodiments described and shown or to the uses described and shown, but encompasses any variant thereof.

In particular, instead of operating from the front, as more particularly described and shown, the support system of the invention may instead be operative over the height of the longitudinal walls of the trunking body between which it has to extend, at a point of the longitudinal walls between their top and bottom parts.

Also, rather than constituting groove means, and thus female nesting means, the engagement means that the crossmembers incorporate for engagement with these longitudinal walls may instead constitute male nesting means, as in support systems where a base is equipped with legs constituting male nesting means, complementary female nesting means on the trunking body comprising grooves running along the longitudinal walls of the latter, for example.

Nor do the fixing means with which the crossmembers of the support system of the invention are equipped necessarily form a screw well, other fixing means for fastening the device to be fixed to these crossmembers being equally feasible, for example snap-fastener means.

Finally, and as in the embodiment shown in FIG. 17, the lips on the longitudinal walls of the trunking body can be different widths, in which case centering is not relative to the longitudinal plane of symmetry of the corresponding compartment but relative to the median plane of its cover.

There is claimed:

1. Support system for mounting electrical or non-electrical apparatus and fittings in a trunking body having generally parallel longitudinal walls with opposed edge portions, the support system comprising two crossmembers having engagement means cooperable with respective edge portions and being positionable at desired locations along the edge portions, and self-arresting fixing means carried by each of said crossmembers, said self-arresting fixing means comprising opposed pluralities of detents and spring biasing means for normally urging said detents into mutual engagement, said detents affording said self-arresting fixing means with a multiplicity of stable intermediate positions located along the respective crossmembers, between the respective engagement means.

2. The support system according to claim 1, wherein each said fixing means comprises part of a fixing member separate and distinct from the respective crossmember.

3. The support system according to claim 2, wherein each said fixing member also comprises means cooperable with the respective crossmember for locking said fixing member in position thereon.

4. The support system according to claim 2, wherein each said fixing means is integral with said fixing member, each said fixing member defining a unitary subassembly with the respective crossmember.

5. The support system according to claim 2, wherein each said fixing member includes two substantially parallel lugs, one of the lugs being a locking lug engageable in a slot extending along an edge of the respective crossmember, the other of the lugs being a retaining lug extending beyond the edge of the respective crossmember and being hooked into a groove on a rear face of the respective crossmember, said groove extending parallel to said edge, said locking lug having a first set of said detents and a corresponding wall of said slot having a complementary second set of said detents cooperable with said first set of detents of the locking lug.

6. The support system according to claim 5, wherein said spring biasing means comprises an elastically deformable tongue extending parallel to and spaced from the respective locking lug, said tongue elastically engaging another wall of said slot disposed opposite said corresponding wall.

7. The support system according to claim 6, further comprising indexing means between each said fixing member and the respective crossmember.

8. The support system according to claim 7, wherein each of said crossmembers has a central portion and at least one break-off portion at at least one end thereof, the respective engagement means being provided on said central portion and said at least one break-off portion.

9. The support system according to claim 1, wherein each said fixing means defines a threaded well cooperable with a threaded fastener.

10. The support system according to claim 1, wherein each said crossmember is of one-piece construction.

11. The support system according to claim 1, wherein each said crossmember is four-sided plate-like configuration.

12. Support system for mounting electrical or non-electrical apparatus and fittings in a trunking body having generally parallel longitudinal walls with opposed edge portions, the support system comprising two crossmembers having engagement means cooperable with respective edge portions and being positionable at desired locations along the edge portions, and self-arresting fixing means carried by each of said crossmembers, said self-arresting fixing means having a multiplicity of stable intermediate positions located along the respective crossmembers, between the respective engagement means, each said fixing means comprising part of a fixing member separate and distinct from the respective crossmember, each said fixing member including two substantially parallel lugs, one of the lugs being a locking lug engageable in a slot extending along an edge of said respective crossmember, and the other of the lugs being a retaining lug extending beyond the edge of the respective crossmember and hooked into a groove on a rear face of the respective crossmember, said groove extending parallel to said edge.

13. The support system according to claim 12, wherein each of said crossmembers has a slot in each of two opposed transverse edges, said groove extending along a centerline of the respective crossmember substantially parallel to said transverse edges.

14. Support system for mounting electrical or non-electrical apparatus and fittings in a trunking body having generally parallel longitudinal walls with opposed edge portions, the support system comprising two crossmembers having engagement means cooperable with respective edge portions and being positionable at desired locations along the edge portions, and self-arresting fixing means carried by each of said crossmembers, said self-arresting fixing means having a multiplicity of stable intermediate positions located along the respective crossmembers, between the respective engagement means, each said engagement means engageable with the edge portions of the longitudinal walls comprising respective grooves in corresponding opposed longitudinal edges of the respective crossmember, a lip defined between a sidewall of the groove and a front face of the respective crossmember being thinner than another lip defined between an opposite sidewall of the groove and a rear face of the respective crossmember.

15. Support system for mounting electrical or non-electrical apparatus and fittings in a trunking body having generally parallel longitudinal walls with opposed edge portions, the support system comprising two crossmembers having engagement means cooperable with respective edge portions and being positionable at desired locations along the edge portions, and self-arresting fixing means carried by each of said crossmembers, said self-arresting fixing means having a multiplicity of stable intermediate positions located along the respective crossmembers, between the respective engagement means, each of said crossmembers has a central portion and at least one break-off portion at at least one end thereof, respective said engagement means being provided on said central portion and said at least one break-off portion.

* * * * *